US009661073B2

(12) United States Patent
Chang et al.

(10) Patent No.: US 9,661,073 B2
(45) Date of Patent: May 23, 2017

(54) WEB BROWSER SYNCHRONIZATION WITH MULTIPLE SIMULTANEOUS PROFILES

(75) Inventors: Jeffrey Albert Chang, Palo Alto, CA (US); Miranda R. Callahan, New York, NY (US); Glen Murphy, Palo Alto, CA (US); Marc Pawliger, San Jose, CA (US)

(73) Assignee: Google Inc., Mountain View, CA (US)

( * ) Notice: Subject to any disclaimer, the term of this patent is extended or adjusted under 35 U.S.C. 154(b) by 533 days.

(21) Appl. No.: 13/350,647

(22) Filed: Jan. 13, 2012

(65) Prior Publication Data

US 2015/0215398 A1 Jul. 30, 2015

Related U.S. Application Data

(60) Provisional application No. 61/561,791, filed on Nov. 18, 2011.

(51) Int. Cl.
| | |
|---|---|
| *G06F 3/00* | (2006.01) |
| *H04L 29/08* | (2006.01) |
| *H04L 29/06* | (2006.01) |
| *G06F 17/30* | (2006.01) |
| *G06F 3/01* | (2006.01) |

(52) U.S. Cl.
CPC .... *H04L 67/1095* (2013.01); *G06F 17/30899* (2013.01); *H04L 63/083* (2013.01); *H04L 67/02* (2013.01); *H04L 67/306* (2013.01)

(58) Field of Classification Search
USPC ......... 715/745, 751; 713/182, 183, 184, 185
See application file for complete search history.

(56) References Cited

U.S. PATENT DOCUMENTS

| | | | | |
|---|---|---|---|---|
| 5,736,984 | A  * | 4/1998 | Jellinek et al. | 715/710 |
| 6,240,444 | B1 * | 5/2001 | Fin et al. | 709/205 |
| 6,297,819 | B1 * | 10/2001 | Furst | 715/733 |
| 6,958,981 | B1 * | 10/2005 | Hemminger | 370/270 |
| 6,996,718 | B1 * | 2/2006 | Henry et al. | 713/182 |
| 7,039,656 | B1 * | 5/2006 | Tsai et al. | |
| 7,590,705 | B2 * | 9/2009 | Mathew et al. | 709/217 |
| 7,917,521 | B2 | 3/2011 | Brown et al. | |
| 7,958,453 | B1 * | 6/2011 | Taing | 715/744 |

(Continued)

OTHER PUBLICATIONS

J. Hathaway, "Multifox: log into websites with multiple accounts, simultaneously", retrieved from <http://downloadsquad.switched.com/2009/12/15/multifox-log-into-websites-with-multiple-accounts-simultaneous>, Dec. 15, 2009.

*Primary Examiner* — Toan Vu
(74) *Attorney, Agent, or Firm* — McDermott Will & Emery LLP

(57) ABSTRACT

Computer-implemented methods for synchronizing a personalized web browsing experience on multiple devices by logging into a web browser on each device using a pre-existing profile are provided. In one aspect, a method includes receiving a request to open a first instance of a web browser, and receiving, in the first instance of the web browser, log in information for a pre-existing profile created independently of the web browser. The method also includes providing web browser personalization information for the pre-existing profile in response to the receipt of the log in information for the pre-existing profile. Systems, web browsers, and machine-readable media are also provided.

21 Claims, 8 Drawing Sheets

(56) References Cited

U.S. PATENT DOCUMENTS

| | | |
|---|---|---|
| 8,224,999 B2 * | 7/2012 | Suryanarayana .............. 709/248 |
| 8,225,191 B1 * | 7/2012 | Kalman ......................... 715/203 |
| 2003/0009521 A1 * | 1/2003 | Cragun ......................... 709/205 |
| 2003/0140312 A1 * | 7/2003 | Mohan et al. ................. 715/513 |
| 2006/0074672 A1 * | 4/2006 | Allefs ............................ 704/258 |
| 2006/0095476 A1 * | 5/2006 | Dauer et al. .................. 707/200 |
| 2006/0259553 A1 * | 11/2006 | Kawakita ...................... 709/205 |
| 2006/0277322 A1 * | 12/2006 | Liu ................................ 709/246 |
| 2007/0283011 A1 * | 12/2007 | Rakowski et al. ............ 709/225 |
| 2008/0168106 A1 * | 7/2008 | Freedman ..................... 707/201 |
| 2008/0184157 A1 * | 7/2008 | Selig ............................. 715/781 |
| 2008/0235619 A1 * | 9/2008 | Lee ............................... 715/804 |
| 2009/0077124 A1 * | 3/2009 | Spivack et al. ............ 707/103 Y |
| 2009/0144451 A1 * | 6/2009 | Cabezas et al. .............. 709/248 |
| 2009/0157831 A1 * | 6/2009 | Tian et al. .................... 709/206 |
| 2009/0172795 A1 * | 7/2009 | Ritari et al. ....................... 726/7 |
| 2009/0228504 A1 * | 9/2009 | Brown et al. ................. 707/101 |
| 2010/0037145 A1 * | 2/2010 | Sides ............................. 715/744 |
| 2010/0211884 A1 * | 8/2010 | Kashyap et al. .............. 715/745 |
| 2010/0235321 A1 * | 9/2010 | Shukla et al. ................. 707/610 |
| 2010/0293602 A1 * | 11/2010 | Uchida ............................. 726/4 |
| 2012/0005283 A1 * | 1/2012 | Provo et al. .................. 709/206 |
| 2012/0023183 A1 * | 1/2012 | Newman et al. .............. 709/206 |
| 2012/0030587 A1 * | 2/2012 | Ketkar ........................... 715/751 |
| 2012/0054640 A1 * | 3/2012 | Nancke-Krogh .............. 715/751 |
| 2012/0166388 A1 * | 6/2012 | Glatt et al. .................... 707/610 |

\* cited by examiner

WEB BROWSER SYNCHRONIZATION WITH MULTIPLE SIMULTANEOUS PROFILES

CROSS-REFERENCE TO RELATED APPLICATIONS

The present application claims the benefit of priority under 35 U.S.C. §119 from U.S. Provisional Patent Application Ser. No. 61/561,791 entitled "Web Browser Synchronization with Multiple Simultaneous Profiles," filed on Nov. 18, 2011, the disclosure of which is hereby incorporated by reference in its entirety for all purposes.

BACKGROUND

Field

The present disclosure generally relates to the transmission of data over a network, and more particularly to the use of a computing device to communicate over a network.

Description of the Related Art

Users that access secured information using the Internet often create different user accounts (e.g., logins and passwords) for the web sites that they securely access using a web browser. Such web browsers can be personalized by a user on the user's device, such as by saving bookmarks, saving user account information for the secure web sites, and downloading applications. When the user uses another device, the user must often repeat the personalization of the web browser on the other device with the same information in order to have a similar web browsing experience. This is difficult for users because it requires them to remember their personalized information, including their user account information for the secure web sites.

Web browsers that do allow for personalized information to be synchronized across different devices, however, require that the user create yet another account (e.g., another login and password) in order to update the personalized information across devices. Furthermore, such web browsers do not permit users to browse web pages under separate logins with separate, personalized information for those separate logins. For example, a user cannot have one instance of the web browser open that is logged in to a first account and browse web pages logged in to that first account, while simultaneously having a second instance of the web browser open that is logged in to a second account and browsing web pages logged in to that second account.

SUMMARY

According to one embodiment of the present disclosure, a computer-implemented method for synchronizing a personalized web browsing experience on multiple devices by logging into a web browser on each device using a pre-existing profile is provided. The method includes receiving a request to open a first instance of a web browser, and receiving, in the first instance of the web browser, log in information for a pre-existing profile created independently of the web browser. The method also includes providing web browser personalization information for the pre-existing profile in response to the receipt of the log in information for the pre-existing profile.

According to another embodiment of the present disclosure, a system for synchronizing a personalized web browsing experience on multiple devices by logging into a web browser on each device using a pre-existing profile is provided. The system includes a memory that includes instructions for synchronizing web browser personalization information, and a processor. The processor is configured to execute the instructions to receive a request to open a first instance of a web browser on a device, and receive, in the first instance of the web browser, log in information for a pre-existing profile created independently of the web browser. The processor is also configured to execute the instructions to provide the web browser personalization information for the pre-existing profile in response to the receipt of the log in information for the pre-existing profile.

According to a further embodiment of the present disclosure, a web browser that synchronizes a personalized web browsing experience on multiple devices using a pre-existing profile is provided. The web browser includes a log in interface configured to receive, in a first instance of the web browser, log in information for a pre-existing profile created independently of the web browser, and a synchronization interface configured to provide the web browser personalization information for the pre-existing profile in response to the receipt of the log in information for the pre-existing profile. In response to receiving log in information for a second profile in a second instance of the web browser, the synchronization interface is configured to load the web browser personalization information for the second profile in the second instance of the web browser in response to the receipt of the log in information for the second profile while the first instance of the web browser remains logged in to the pre-existing profile.

According to yet a further embodiment of the present disclosure, a machine-readable storage medium includes machine-readable instructions for causing a processor to execute a method for synchronizing a personalized web browsing experience on multiple devices by logging into a web browser on each device using a pre-existing profile is provided. The method includes receiving a request to open a first instance of a web browser, and receiving, in the first instance of the web browser, log in information for a pre-existing profile created independently of the web browser. The method also includes providing the web browser personalization information for the pre-existing profile in response to the receipt of the log in information for the pre-existing profile. The log in information is configured for the web browser, and the log in information includes an email address and a password. The password for the log in information is the same password used to access email for the email address.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
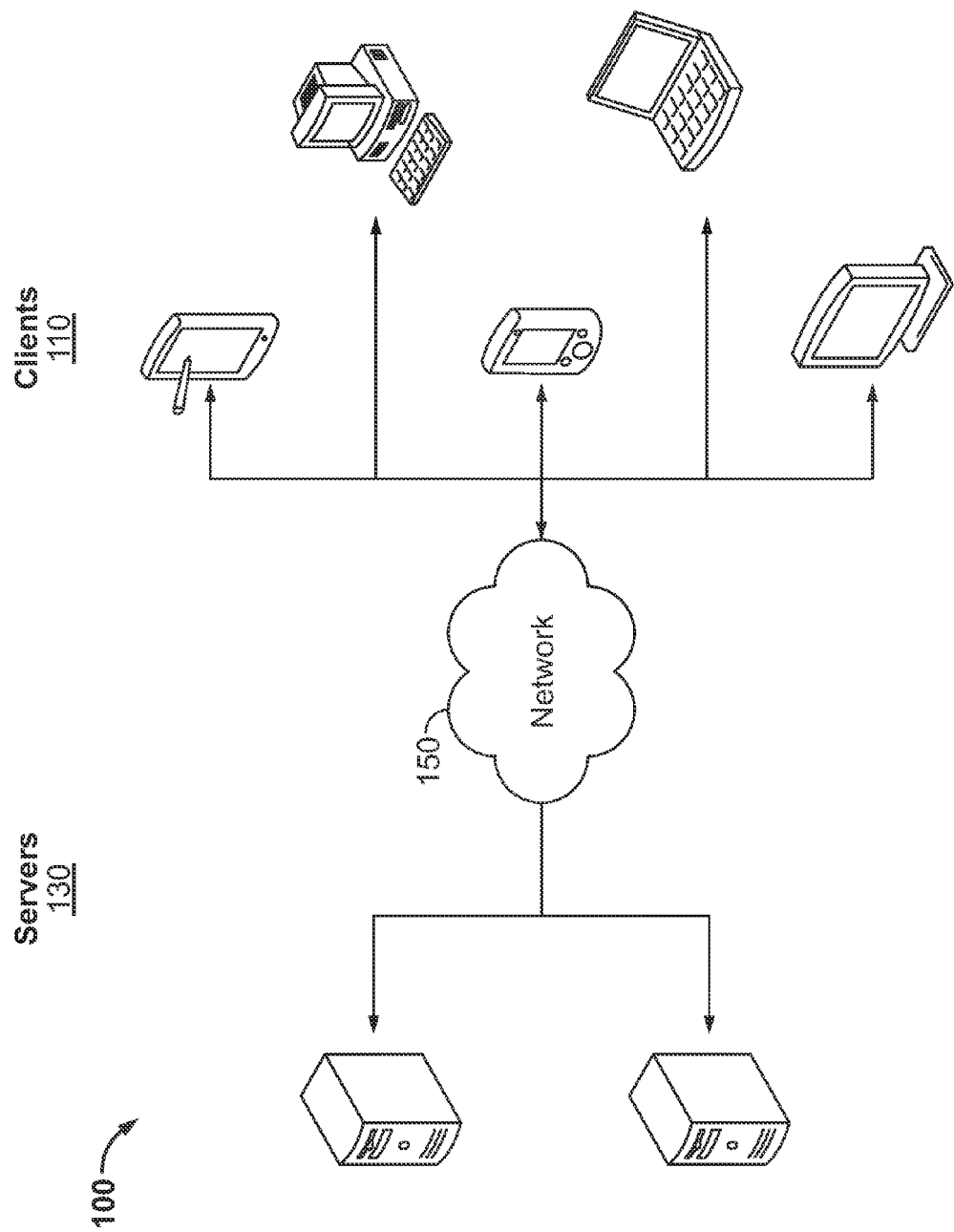
FIG. 1 illustrates an exemplary architecture for personalizing a web browsing experience on multiple devices by logging into a web browser using a pre-existing profile.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed web browser allows a user to use a pre-existing account (i.e., pre-existing login and password) to synchronize personalized web browser information across devices. By entering the same, pre-existing username and password in the web browser on any device, the user's bookmarks, preferences, form information, themes, passwords, extensions, apps, history (including recently viewed web pages), and other information can be synchronized across devices.

The disclosed web browser also allows the user to simultaneously open a second instance of the web browser that is both synchronized (e.g., by downloading) with the personalized web browser information of a second pre-existing account, and independently logged in to secure pages associated with the second pre-existing account. For example, with the disclosed web browser, users can have one instance of the disclosed web browser open that is logged in to a first account (e.g., its bookmarks and web browser themes) and browse web pages logged in to that first account, while simultaneously having a second instance of the disclosed web browser open that is logged in to a second account (e.g., with its different bookmarks and web browser themes) and browsing web pages logged in to that second account.

The disclosed web browser further allows retrieved password information from another web browser to be automatically submitted to web pages viewed by the user, such that when the user views a web page secured by authentication (e.g., such as an email web site) in the web browser on any device, the user will already be logged in to the secure web page. For example, if the user logs in to an email web portal for the user's email in the web browser on a first device, then the user will automatically be logged in to the email web portal for the user's email when the user uses a synchronized web browser on a second device.

Although many examples provided herein describe a user's information being stored in memory, the user can, at any time, delete the user information from memory and/or opt out of having the user information stored in memory. Additionally, the user can, at any time, adjust appropriate privacy settings to selectively limit the types of user information stored in memory, or select the memory in which the user information is stored (e.g., locally on the user's device as opposed to remotely a server). In many examples, the user information does not include and/or share the specific identification of the user (e.g., the user's name) unless otherwise specifically provided or directed by the user.

Turning to the drawings, FIG. 1 illustrates an exemplary architecture 100 for personalizing a web browsing experience on multiple devices by logging into a web browser using a pre-existing profile. The architecture 100 includes servers 130 and clients 110 connected over a network 150.

Each of the clients 110 is configured to run a web browser as disclosed herein. The web browser is configured to run on clients 110 that are mobile or non-mobile. The clients 110 can be, for example, desktop computers, laptop computers, mobile devices (e.g., a smartphone, tablet computer, or PDA), set top boxes (e.g., for a television), video game consoles, projectors, or any other devices having appropriate processor, memory, and communications capabilities.

Data for the web browser can be synchronized by the web browser on any of the clients 110 over the network 150 with one or many of the servers 130. For purposes of load balancing, multiple servers 130 can host the synchronizable data (or "personalization information") for the web browser. The servers 130 can be any device having an appropriate processor, memory, and communications capability for hosting the synchronizable data. The synchronizable data can include, for example: user profiles for accessing the synchronizable data; Uniform Resource Identifiers (URIs) such as bookmarks and identifications of web pages a user has previously opened; logins, including user names and passwords; web browser history, including currently opened tabs; search history, including previously entered search queries; form information; web browser components (e.g., web browser extensions and web browser applications); and web browser themes.

As discussed herein, a web browser application (or "web app") is a software program that is designed to be installed by a web browser and used within the web browser. Web apps can be, for example, hosted web apps or packaged web apps. A hosted web app includes data for a display of a normal website supplemented with extra metadata. The extra metadata provides a description of the application, including, for example, a name, description, version, relevant web addresses (e.g., URI addresses that the hosted web app uses), launch instructions, appearance data, icon information, unique identifier(s), compatible web browser information, and update information. Unlike hosted web apps, packaged web apps are downloadable and can therefore operate offline. Packaged web apps are also integratable with a web browser because hosted web apps are configured to access web browser extensions.

As discussed herein, a web browser extension (hereinafter "extension") is a software program that modifies and/or adds functionality to a web browser. Both extensions and packaged web apps can be written using, for example, web technologies such as HyperText Markup Language (HTML), JavaScript, and Cascading Style Sheets (CSS). An extension can be used to build packaged web apps. Both extensions and packaged web apps can bundle all associated data into a single data file that the web browser downloads and installs. Thus, unlike hosted web apps, extensions and packaged web apps do not depend on an active network connection.

The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

The disclosed web browser is configured to synchronize data with other web browsers associated by a user profile on other clients 110 through mutually accessible synchronizable data available on the servers 130. Specifically, the user can open one instance of the web browser, and log in to that instance of the web browser (which is different than logging in to a web page in the web browser) with a pre-existing profile (e.g., a pre-existing email address and password combination). In response, that instance of the web browser will synchronize synchronizable data associated with the profile, such as bookmarks, applications, extensions, authentication information, passwords, and form data, with corresponding synchronizable data available on the servers 130. Additional instances of the web browser can be opened simultaneously, with each instance of the web browser logged in to different pre-existing profiles and separately synchronized with personalization information associated with the corresponding pre-existing profile using data on the servers 130. Once an instance of a web browser is logged in to a pre-existing profile and the corresponding personalization data has been synchronized, then the web browser automatically logs in to and authenticates the user with secure web pages (e.g., email web interfaces) using the user's authentication information from the personalization information when the user visits the secure web pages.

Figure 2:
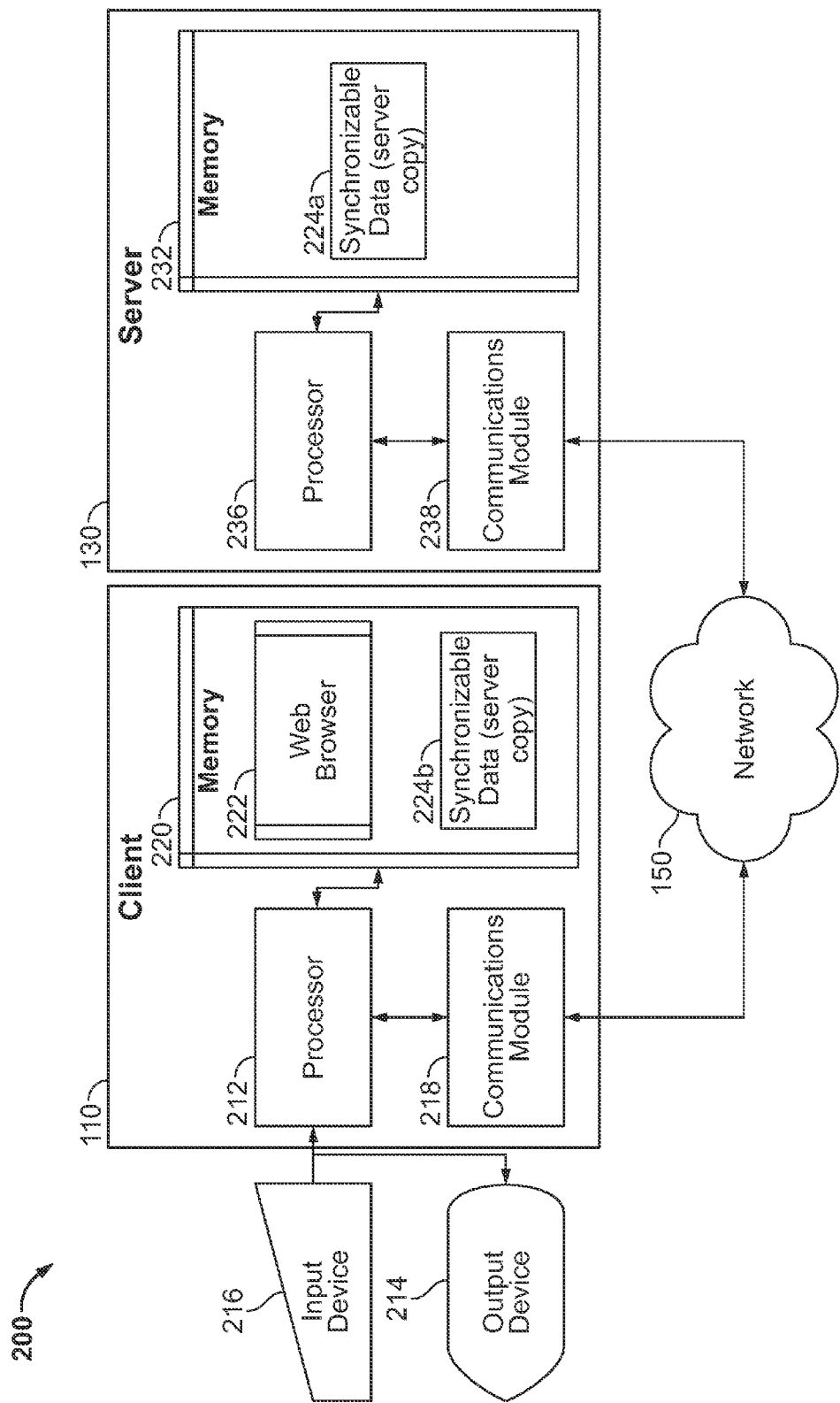
FIG. 2 is a block diagram illustrating an exemplary client and server from the architecture of FIG. 1 according to certain aspects of the disclosure.

FIG. 2 is a block diagram 200 illustrating an exemplary server 130 and client 110 in the architecture 100 of FIG. 1 according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The client 110 includes a processor 212, the communications module 218, and a memory 220. The memory 220 includes a web browser 222 and a local, client copy of synchronizable data 224b for the web browser 222. The web browser 222 is displayed on the client 110 using the output device 214 (e.g., a display) of the client 110. The client 110 also includes an input device 216, such as a keyboard, touchscreen, or mouse, to receive user input for the web browser 222. The synchronizable data 224b for the web browser 222 can be synchronized across various other clients associated with the client 110, via a server copy of synchronizable data 224a stored on the server 130, by respective web browsers that are associated among the clients 110 using a common pre-existing user profile, such as a pre-existing email address and password combination. The pre-existing profile is initially created for another service, such as an email account. The pre-existing profile is then associated with the data synchronization process disclosed herein when the pre-existing profile is provided to the web browser 222 for the first time. The synchronizable data 224b in the memory 220 of the client 110 can be first generated on the client 110 (e.g., when the pre-existing profile is provided to the web browser 222 for the first time), or downloaded to the client 110 from a server copy of synchronizable data 224a stored in a memory 232 of a server 130. Specifically, the synchronizable data 224a can be provided to the client 110 over the network 150 by the processor 236 of the server 130 via respective communications modules 218 and 238 of the client 110 and server 130.

The processor 212 of the client 110 is configured to execute instructions, such as instructions physically coded into the processor 212, instructions received from software in memory 220, or a combination of both. For example, the processor 212 of the client 110 executes instructions from the web browser 222 to receive a request (e.g., from a user of the client 110 or by software on the client 110) to open an instance of the web browser 222, and receive, in each instance of the web browser 222 (e.g., opened on client 110), log in information for a pre-existing profile created independently of the web browser. The log in is provided to the web browser 222 and not a web page in the web browser 222. The pre-existing profile can be, for example, a pre-existing email address and password combination (e.g., a password that is used to otherwise access email for the email address), or a pre-existing username and password combination.

In response to receipt of the log in information, the processor 212 can synchronize the synchronizable data 224b for the web browser 222 in the memory 220 of the client 110 with synchronizable data for another web browser associated with the pre-existing profile on another client by each client associated with the pre-existing profile synchronizing its respective synchronizable data with the synchronizable data 224a on the server 130. As discussed above, the synchronizable data 224a can be provided to the client 110 over the network 150 by the processor 236 of the server 130 via respective communications modules 218 and 238 of the client 110 and server 130.

The processor 212 is further configured to execute instructions from the web browser 222 to load the synchronizable data 224a (e.g., received from the server 130 and synchronized as the synchronizable data 224b in memory 220 on the client 110) for the pre-existing profile in response to the request to load the pre-existing profile. In certain aspects, each instance of the web browser 222 that is logged in to a different pre-existing profile is a separate process running in the memory 220 of the client 110, and client copies of the synchronizable data 224b are kept separately (e.g., in separate folders and/or files) in memory 220 for each pre-existing profile. Thus, in certain aspects, simultaneous instances of the web browser 222 may run concurrently, with a first instance of the web browser 222 logged in to a first pre-existing profile and a second instance of the web browser 222 on the client 110 simultaneously logged in to a second pre-existing profile. The processor 212 can, for example, retrieve web page authentication information for a user from the synchronizable data 224b for that user, and use the web page authentication information to automatically authenticate web pages using the web page authentication information. For instance, if the synchronizable data 224b for a user includes web page authentication information, such as the username and password, for an online calendar for the user, then the processor 212 is configured to automatically log in the user to a web page for the online calendar when the user visits the web page. When the user visits the web page for the online calendar, the user will thus not see the log in screen for the calendar, but instead, the user will see the user's own online calendar.

Figure 3:
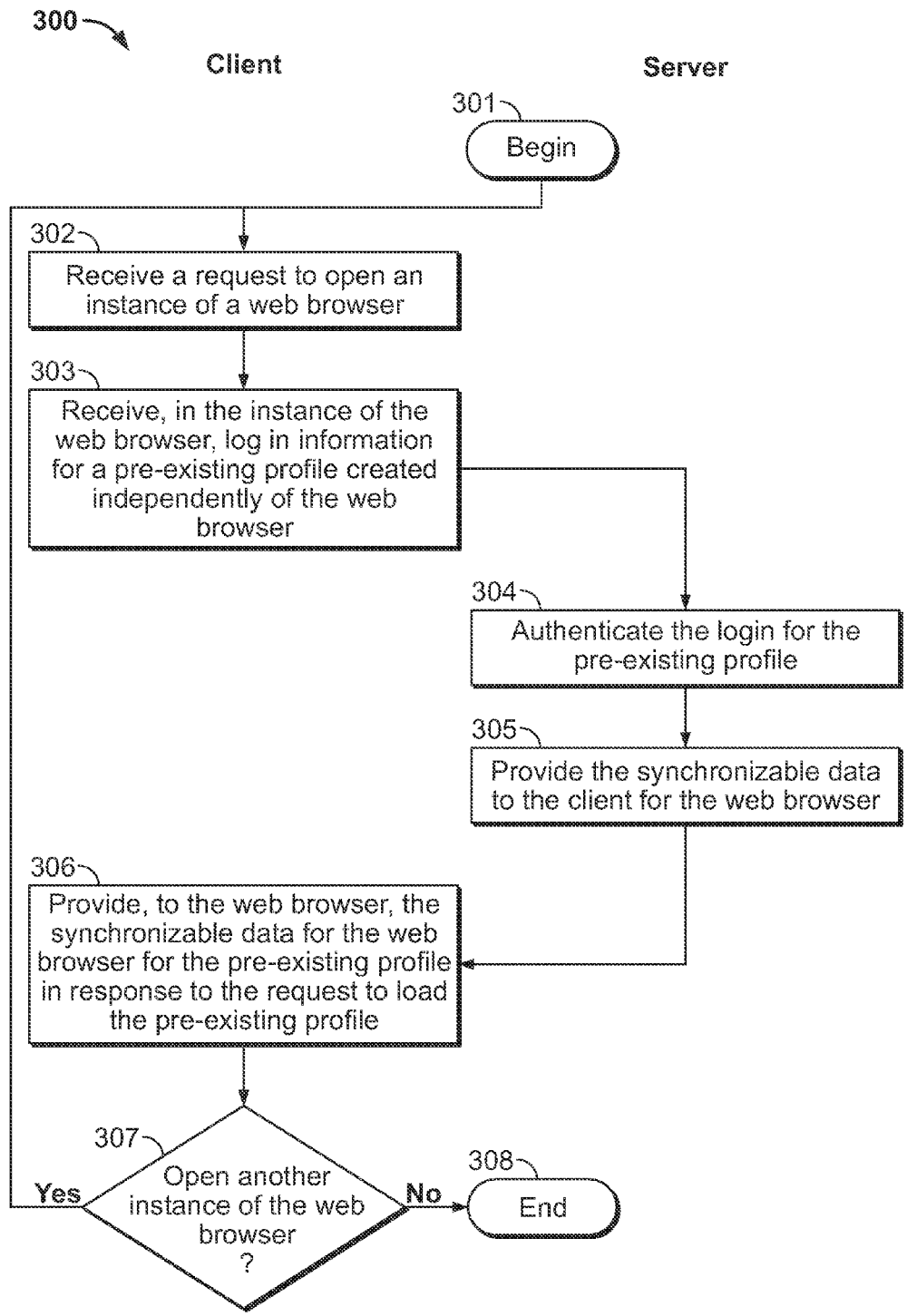
FIG. 3 illustrates an exemplary process for personalizing a web browsing experience on multiple devices by logging into a web browser using a pre-existing profile using the exemplary client of FIG. 2.

FIG. 3 illustrates an exemplary process 300 for personalizing a web browsing experience on multiple devices by logging into a web browser using a pre-existing profile using the exemplary client 110 of FIG. 2. The process 300 begins by proceeding from beginning step 301 to step 302 when a request to open an instance of a web browser 222 is received on the client 110. In step 303, a log in for a pre-existing profile created independently of the web browser 222 is received in the instance of the web browser 222. In step 304, the server 130 authenticates the log in for the pre-existing profile, and in step 305, the server 130 provides a copy of the synchronizable data 224a to the client 110, which is then loaded into the memory 220 of the client 110 in step 306 as a local copy of the synchronizable data 224b, thereby personalizing the web browser 222. In step 307, if another instance of the web browser 222 is opened (e.g., to log in to a different pre-existing profile for personalization of the other instance of the web browser), then the process 300 returns to step 302, otherwise the process 300 ends.

Figure 4A:
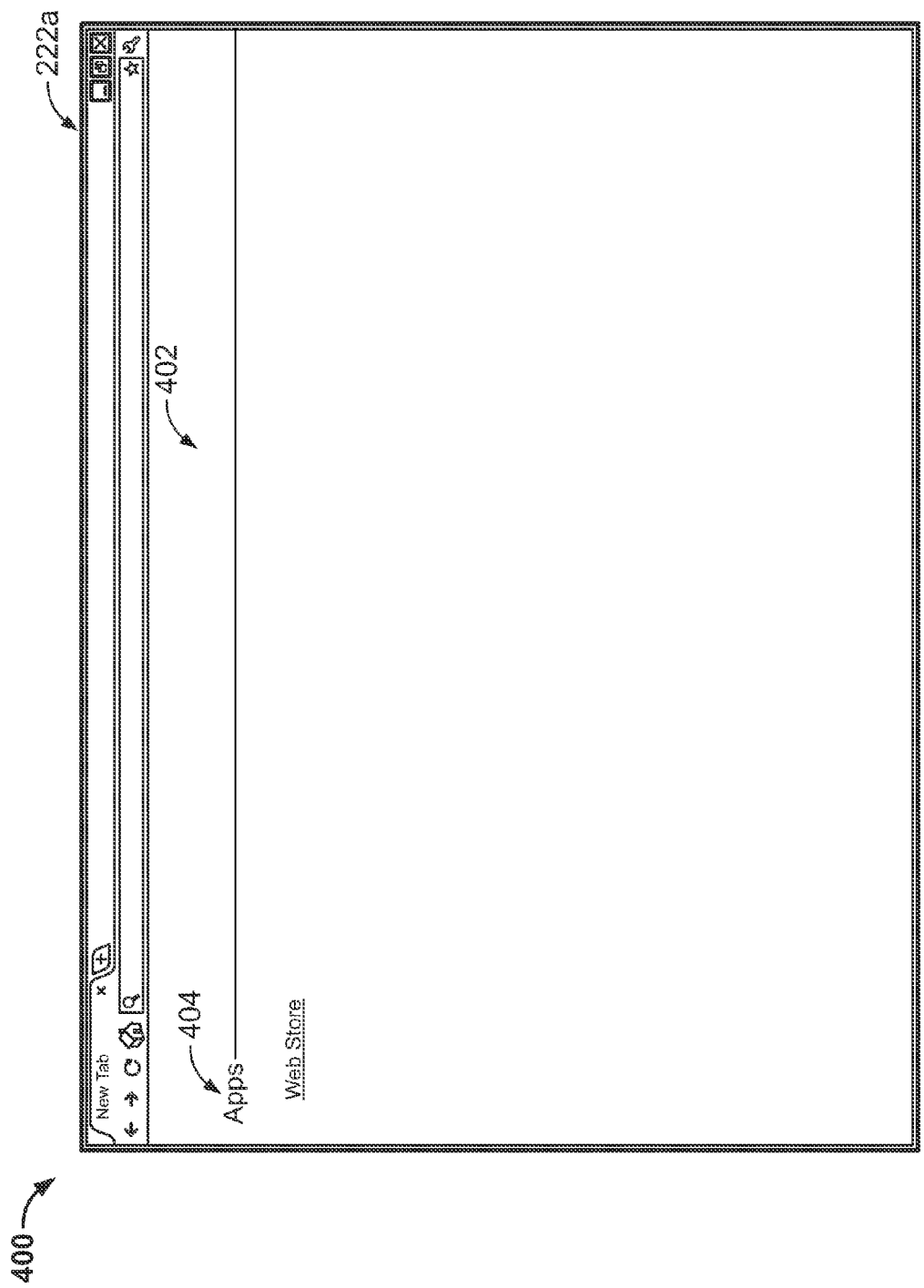
FIGS. 4A-4D are exemplary screenshots associated with the exemplary process of FIG. 3.
Figure 4B:
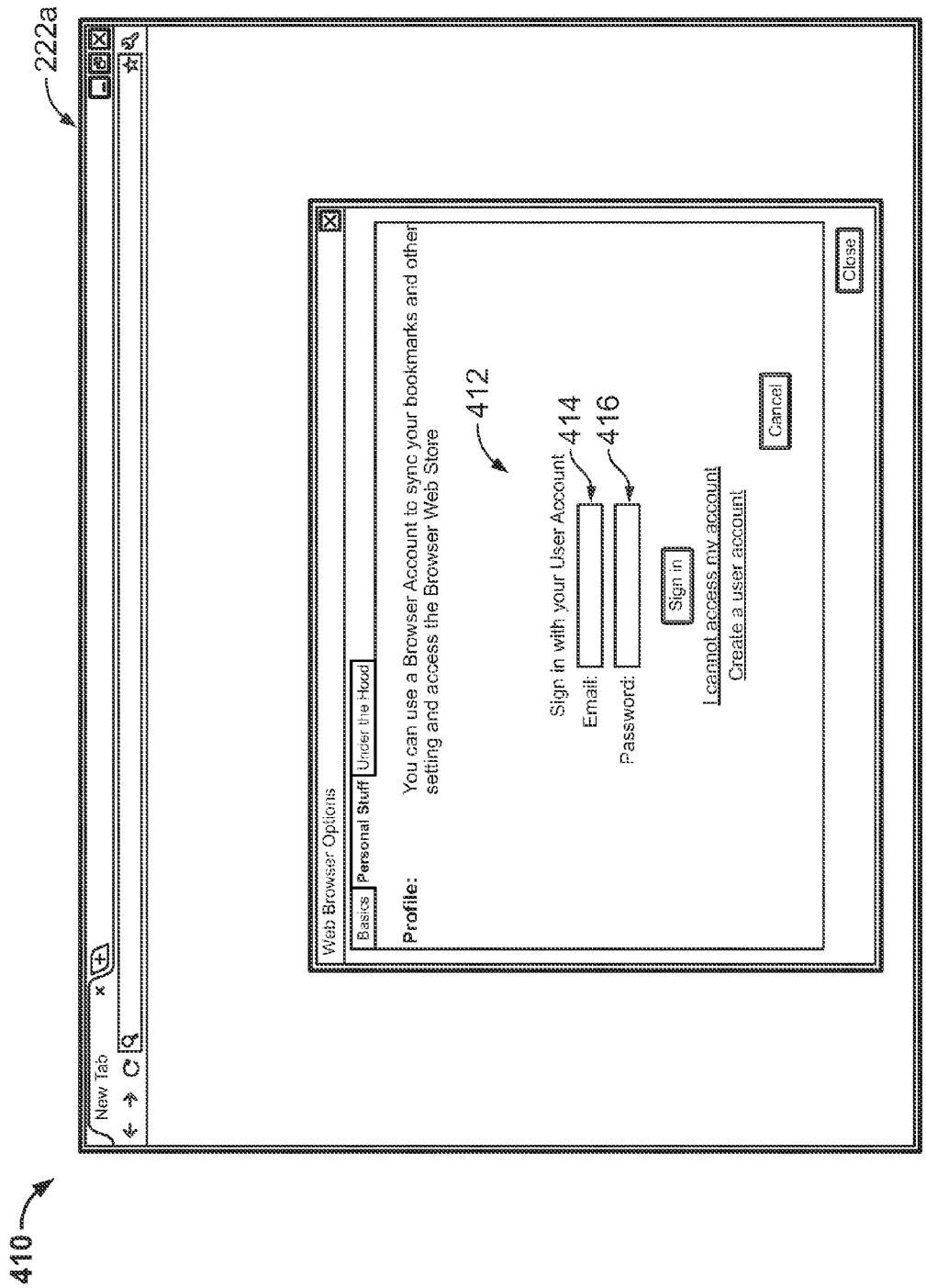

An example will now be described using the exemplary process 300 of FIG. 3, a client desktop computer 110, and two pre-existing profiles, one for John Doe and one for Jane Doe. The process 300 begins by proceeding from beginning step 301 to step 302 when John Doe requests to open an instance of a web browser 222a on his desktop computer 110. FIG. 4A is an exemplary screenshot 400 of the instance of the web browser 222a. As shown in FIG. 4A, John Doe's instance of web browser 222a is not personalized because it contains no apps 404 or bookmarks 402. As illustrated in FIG. 4B, another exemplary screenshot 410 of John Doe's instance of the web browser 222a, user John Doe in step 303 is prompted by the web browser 222a with a log in interface 412 for entering an email address 414 and password 416 for a pre-existing profile created independently of the web browser 222. In response, John Doe provides the authenticating email address and password information for his pre-existing profile.

Figure 4C:
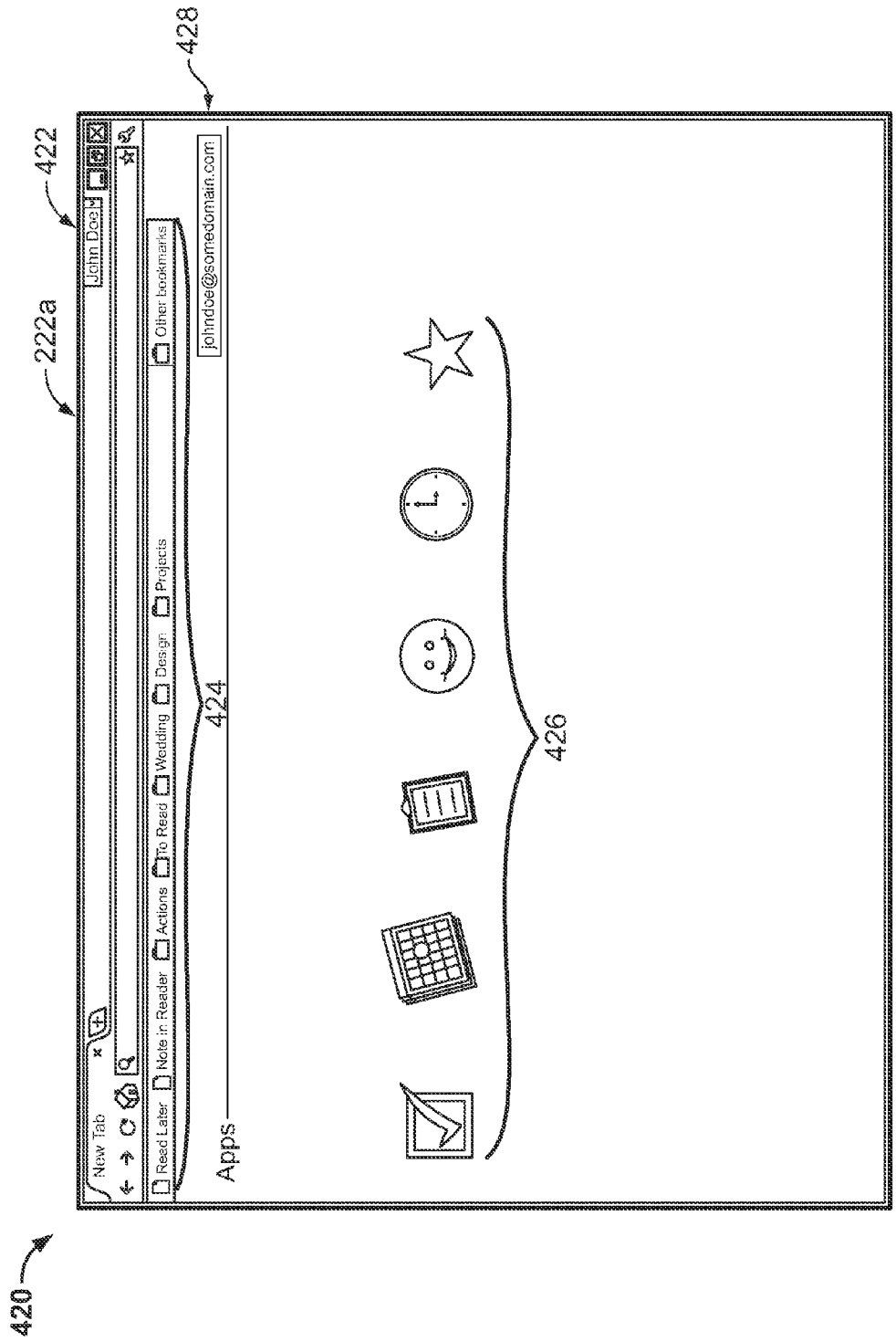

In step 304, the server 130 hosting John Doe's synchronizable data 224b authenticates the log in for the pre-existing profile, and in step 305 the server 130 provides a copy of John Doe's synchronizable data 224a to the desktop computer 110, which is then loaded in step 306 by a synchronization interface of the web browser 222a into the memory 220 of the client 110 as a local copy of the synchronizable data 224b, thereby personalizing the web browser 222a. FIG. 4C is an exemplary screenshot 420 of John Doe's instance of the web browser 222a after it has been personalized with John Doe's apps 426 and bookmarks 424 from John Does' synchronizable data 224b on the server 130. The web browser instance 222a provides a visual indication 422 in a title bar area that John Doe is logged in to the web browser 222a with John Doe's pre-existing profile, and, on a new tab page, further identifies John Doe's email address 428 associated with the pre-existing profile.

In step 307, the second user, Jane Doe, decides to open another instance 222b of the web browser, and the process 300 returns to step 302. Jane Doe's instance of web browser 222b is not personalized because Jane Doe has not logged in to the web browser 222b, so Jane Doe's instance of web browser 222b contains no apps 404 or bookmarks 402. Jane Doe in step 303 is prompted by the web browser 222b with a log in interface 412 for entering an email address 414 and password 416 for a pre-existing profile created independently of the web browser 222. In response, Jane Doe provides the authenticating email address and password information for her pre-existing profile.

Figure 4D:
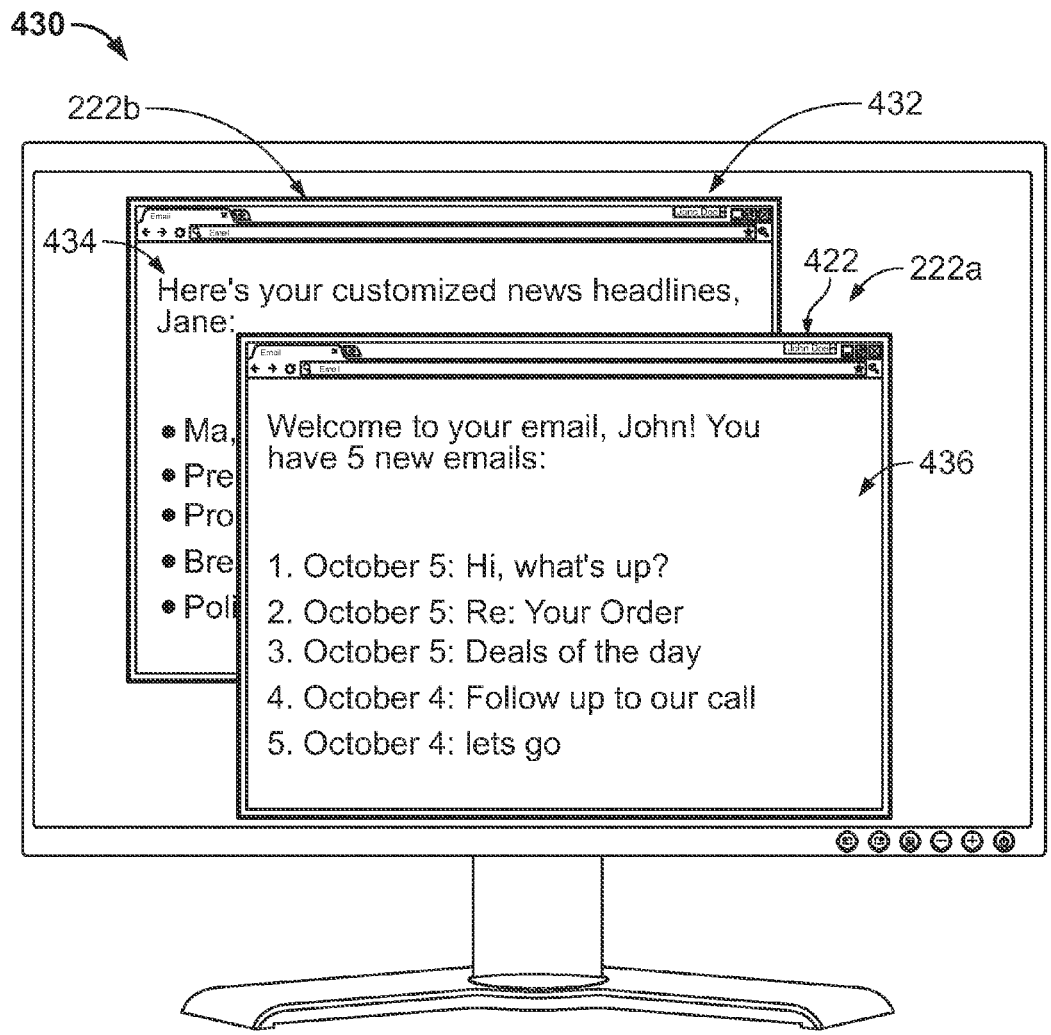

In step 304, the server 130 hosting Jane Doe's synchronizable data 224b authenticates the log in for the pre-existing profile, and in step 305, the server 130 provides a copy of Jane Doe's synchronizable data 224a to the desktop computer 110, which is then loaded in step 306 by the web browser 222b into the memory 220 of the client 110 as a separate local copy of Jane Doe's synchronizable data 224b (as separate from John Doe's synchronizable data 224b) in response to the request of step 305, thereby personalizing the web browser 222b for Jane Doe. FIG. 4D is an exemplary screenshot 430 of John Doe's instance of the web browser 222a running simultaneously with Jane Doe's instance of the web browser 222b after both instances 222a and 222b have been personalized and navigated to web pages requiring authentication. Specifically, in John Doe's instance of the web browser 222a, John Doe has navigated to his email web interface 436, and was automatically logged in to the email web interface 436 by the web browser 222a using John Doe's authentication information from John Doe's synchronizable data 224b. John Doe did not see the log in page for the email web interface nor did John Doe have to manually enter his credentials for accessing his email. Similarly, in Jane Doe's instance of the web browser 222b, which provides a visual indication 432 in a title bar area that Jane Doe is logged in to the web browser 222b with Jane Doe's pre-existing profile, Jane Doe has navigated to her customized news interface 434. Jane Doe was automatically logged in to her customized news interface 434 by her instance of the web browser 222b using Jane Doe's authentication information from Jane Doe's synchronizable data 224b. Jane Doe did not see the log in page for the customized news interface nor did Jane Doe have to manually enter her credentials for accessing her customized news. The process 300 then ends.

Figure 5:
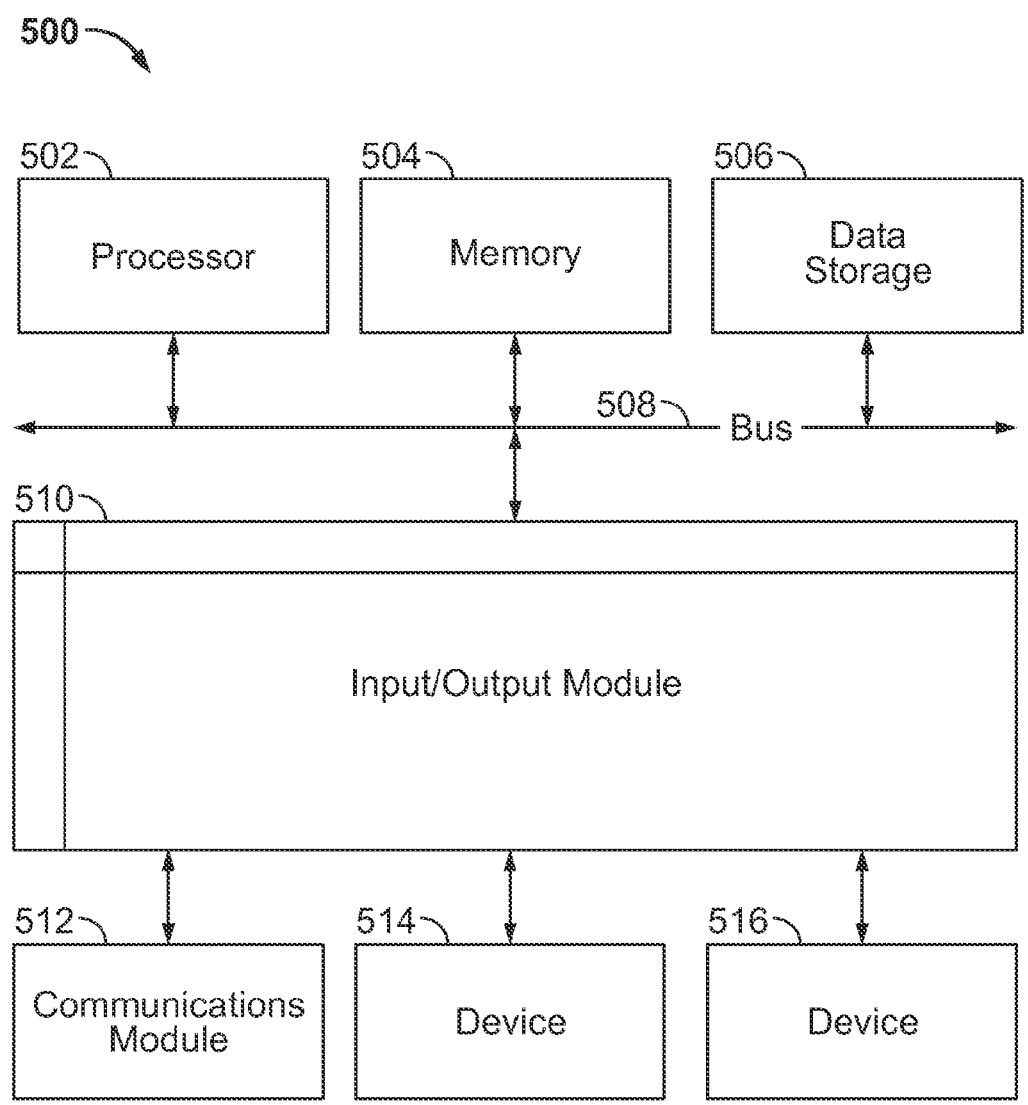
FIG. 5 is a block diagram illustrating an exemplary computer system with which the client and server of FIG. 2 can be implemented.

FIG. 5 is a block diagram illustrating an exemplary computer system 500 with which the client 110 and server 130 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110 and server 130) includes a bus 508 or other communication mechanism for communicating information, and a processor 502 (e.g., processor 212 and 236) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in the specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 (e.g., communications modules 218 and 238) include networking interface cards, such as Ethernet cards and modems. In certain aspects, the input/output module 510 is configured to connect to a plurality of devices, such as an input device 514 (e.g., input device 216) and/or an output device 516 (e.g., output device 214). Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 516 include display devices, such as a CRT (cathode ray tube) or LCD (liquid crystal display) monitor, for displaying information to the user.

According to one aspect of the present disclosure, the client 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in the specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in the specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While the specification contains many specifics, these should not be construed as limitations on the scope of what may be claimed, but rather as descriptions of particular implementations of the subject matter. Certain features that are described in the specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, they should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of the specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method, comprising:
   logging in to a first instance of a web browser with a first pre-existing profile on a first device;
   receiving, on the first device, authentication information for accessing a secure web site, wherein the logging in to the first instance of the web browser is different than accessing the secure web site; and
   providing, to a data synchronization process based on the logging in to the first instance of the web browser, first web browser personalization information, including the authentication information, to automatically access the secure web site on another device without a user interacting with a log in page for the secure web site when the secure web site is accessed using another instance of the web browser logged in to using the first pre-existing profile on the another device,
   wherein, in response to a second instance of the web browser being logged in to with a second pre-existing profile, second web browser personalization information different than the first web browser personalization information is made available to the second instance via the data synchronization process while the first instance of the web browser remains logged in to using the first pre-existing profile.

2. The computer-implemented method of claim 1, further comprising:
   receiving a request to open the second instance of the web browser;
   receiving, in the second instance of the web browser, log in information for the second pre-existing profile; and
   providing the second web browser personalization information for the second pre-existing profile in the second instance of the web browser in response to receipt of the log in information for the second pre-existing profile while the first instance of the web browser remains logged in to the first pre-existing profile.

3. The computer-implemented method of claim 1, wherein the method further comprises:
   receiving, using the data synchronization process, the first web browser personalization information including the authentication information in the another instance of the web browser;
   automatically and without user intervention, accessing the secure web site using the authentication information without interaction with the log in page for the secure web site.

4. The computer-implemented method of claim 1, wherein the first web browser personalization information is provided from a server.

5. The computer-implemented method of claim 1, wherein logging in to the web browser with the first pre-existing profile comprises a request to synchronize the web browser with the first web browser personalization information for the another instance of the web browser associated with the first pre-existing profile on the another device.

6. The computer-implemented method of claim 1, wherein the first instance of the web browser is logged in using log in information configured for the web browser.

7. The computer-implemented method of claim 2, wherein the first instance of the web browser and the second instance of the web browser are opened on the same device.

8. The computer-implemented method of claim 1, wherein the first web browser personalization information comprises Uniform Resource Identifiers, user names, passwords, web browser history, search history, form information, web browser components, and themes.

9. The computer-implemented method of claim 6, wherein the log in information comprises an email address and a password for an account independent of the web browser.

10. The computer-implemented method of claim 9, wherein the password for the log in information is the same password used to access email for the email address.

11. A system, comprising:
    a memory comprising instructions for synchronizing first web browser personalization information;
    a processor configured to execute the instructions to:
       receive, via a first instance of a web browser that is logged into with a first pre-existing profile, authentication information for accessing a secure web site, wherein the first instance of the web browser being logged into is different than the secure web site being accessed; and provide, to a data synchronization process based on the first instance of the web browser being logged into with the first pre-existing profile, the first web browser personalization information comprising the authentication information, wherein the authentication information is provided to the data synchronization process to automatically provide access to the secure web site without a user interacting with a log in page for the secure web site when the secure web site is accessed by another instance of the web browser logged in to using the first pre-existing profile on another device separate from the system, wherein, in response to a second instance of the web browser being logged in to with a second pre-existing profile, second web browser personalization information different than the first web browser personalization information is made available to the second instance via the data synchronization process while the first instance of the web browser remains logged in to using the first pre-existing profile.

12. The system of claim 11, wherein the processor is further configured to execute the instructions to:
receive a request to open the second instance of the web browser on the device;
receive, in the second instance of the web browser, log in information for the second pre-existing profile; and
provide the second web browser personalization information for the second profile in the second instance of the web browser in response to receipt of the log in information for the second pre-existing profile while the first instance of the web browser remains logged in to the pre-existing profile.

13. The system of claim 11, wherein the processor is further configured to execute the instructions to automatically and without user intervention provide the another instance of the web browser access to the secure web site using the authentication information without interaction with the log in page for the secure web site.

14. The system of claim 11, wherein the first instance of the web browser being logged into with the first pre-existing profile comprises a request to synchronize the web browser with the first web browser personalization information for the another instance of the web browser associated with the first pre-existing profile on the another device.

15. The system of claim 11, wherein the first instance of the web browser is logged into using log in information configured for the web browser.

16. The system of claim 11, wherein the first web browser personalization information comprises Uniform Resource Identifiers, user names, passwords, web browser history, search history, form information, web browser components, and themes.

17. The system of claim 15, wherein the log in information comprises an email address and a password for an account independent of the web browser.

18. The system of claim 17, wherein the password for the log in information is the same password used to access email for the email address.

19. A system, comprising:
one or more processors; and
a non-transitory memory medium, the memory medium comprising instructions stored thereon that, when executed by the one or more processors, provide:

a browser interface configured to receive, via a first instance of a web browser that is logged into with a pre-existing profile, authentication information for accessing a secure web site, wherein the first instance of the web browser being logged into is different than the secure web site being accessed; and a synchronization interface configured to provide, to a data synchronization process based on the first instance of the web browser being logged into with the pre-existing profile, first web browser personalization information comprising the authentication information, wherein, in response to a second instance of the web browser being logged into using a second profile, the synchronization interface is configured to provide second web browser personalization information associated with the second profile to the second instance of the web browser while the first instance of the web browser remains logged in to using the pre-existing profile, the second web browser personalization information being different than the first web browser personalization information, and wherein the first web browser personalization information is provided to the data synchronization process to automatically access the secure web site without a user interacting with a log in page for the secure web site when the secure web site is accessed using another instance of the web browser logged in to using the pre-existing profile on another device.

20. A non-transitory machine-readable storage medium comprising machine-readable instructions that, when executed by a processor on a first device, cause the processor to execute a method, the method comprising:
receiving, via a first instance of a web browser logged into with a first pre-existing profile, authentication information for accessing a secure web site, wherein the first instance of the web browser being logged into is different than accessing the secure web site; and providing, to a data synchronization process based on the first instance of the web browser being logged into with the first pre-existing profile, first web browser personalization information comprising the authentication information, wherein a password for the first pre-existing profile is the same password used to access email for an email address, and wherein the first web browser personalization information is provided to the data synchronization process to automatically access the secure web site without a user interacting with a log in page for the secure web site when the secure web site is accessed using another instance of the web browser logged in to using the first pre-existing profile on another device, wherein, in response to a second instance of the web browser being logged in to with a second pre-existing profile, second web browser personalization information different than the first web browser personalization information is made available to the second instance via the data synchronization process while the first instance of the web browser remains logged in to using the first pre-existing profile.

21. A computer-implemented method, comprising:
receiving, in a first instance of a web browser logged into with a pre-existing profile, authentication information for accessing a secure web site, wherein the first instance of the web browser being logged into is different than accessing the secure web site;

providing, to a data synchronization process based on the first instance of the web browser being logged into with the pre-existing profile, first web browser personalization information comprising the authentication information;

receiving, in a second instance of the web browser, log in information for a second profile to log in to the second instance of the web browser using the second profile; and providing second web browser personalization information for the second profile in the second instance of the web browser, based on the second instance of the web browser being logged into using the log in information for the second profile, while the first instance of the web browser remains logged in to the pre-existing profile, wherein the first web browser personalization information is provided to the data synchronization process to automatically access the secure web site without a user interacting with a log in page for the secure web site when the secure web site is accessed using another instance of the web browser logged in to using the pre-existing profile on another device.

* * * * *